Jan. 8, 1929.
V. S. YARNALL
1,697,895
SHOVEL HANDLE
Filed June 13, 1927
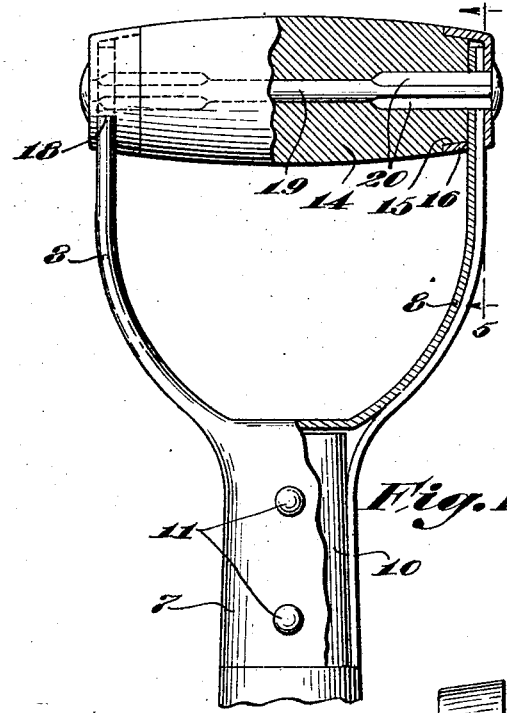
Fig. 1
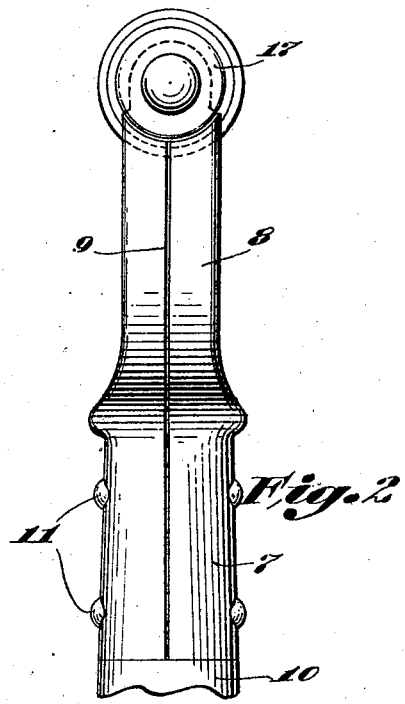
Fig. 2
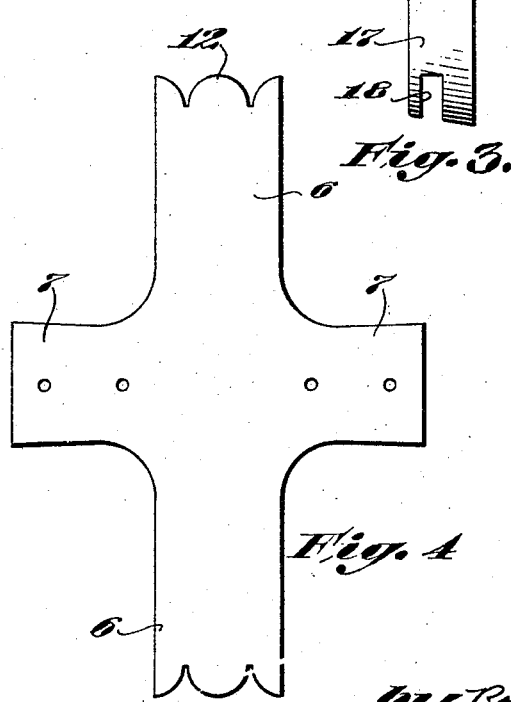
Fig. 3.
Fig. 4
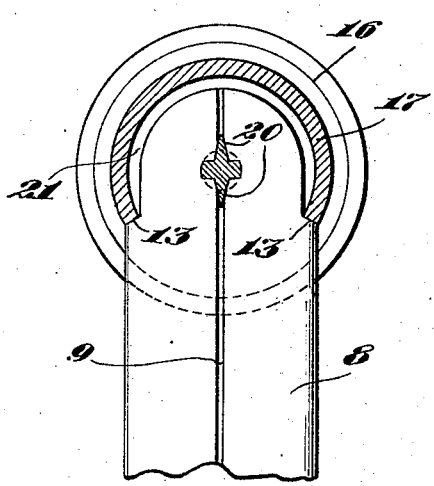
Fig. 5
Inventor
Vere S. Yarnall
by Roberts, Cushman & Woodberry.
Attys.

Patented Jan. 8, 1929.

1,697,895

UNITED STATES PATENT OFFICE.

VERE S. YARNALL, OF BROCKTON, MASSACHUSETTS, ASSIGNOR TO AMES SHOVEL & TOOL COMPANY, OF BOSTON, MASSACHUSETTS, A CORPORATION OF NEW JERSEY.

SHOVEL HANDLE.

Application filed June 13, 1927. Serial No. 198,350.

This invention relates to handles for shovels, spades or similar implements and more particularly to improvements in pressed steel shovel handles of the D type.

The principal objects of the invention include the providing of a shovel handle which will be convenient to grasp and durable in use and which comprises a wooden grip and metal side arms which may be easily and economically manufactured from a single piece of sheet steel; the provision of means, including metal caps or shells, for joining the wooden grip to the side arms, which are so constructed and arranged that the parts may be readily and firmly fitted together irrespective of the precise confirmation of the upper ends of the metal side arms; and the provision of means for assembling the grip within the side arms whereby relative rotation of the grip and handle arms is prevented. Further objects reside in the particular construction and arrangement of parts hereinafter described and pointed out in the appended claims.

A recommended embodiment of the invention is illustrated in the accompanying drawings, in which:

Fig. 1 is a front elevation of a shovel handle constructed in accordance with the invention;

Fig. 2 is a side elevation thereof;

Fig. 3 is a detail view showing one of the metal caps in side elevation;

Fig. 4 is a plan view of the metal blank from which the body portion of the handle is formed; and Fig. 5 is an enlarged section on the line 5—5 of Fig. 1.

The body portion of the handle is preferably formed from a blank of sheet steel stamped in the form of Fig. 4 to provide arm portions 6 and socket portions 7. The side margins of the respective arm portions are folded over flatwise upon the central portion thereof, so that when the side arms 8 of the handle are molded to proper shape the edges of said marginal portions abut upon the outside of the handle, as shown at 9 in Fig. 2. Socket portions 7 are bent downwardly and curved around the end of the wooden shank 10 to which they may be secured by suitable rivets 11, with their side edges approximately in abutting relation.

The ends of the blank portions 6 are preferably cut as shown in Fig. 4, so that when the margins are folded over, the top of the arms will be substantially semi-circular, as represented by the central arc 12. For reasons which will become apparent, the sides of these semi-circular top portions are cut away slightly before the handle elements are assembled, so that top of the side arms take substantially the form illustrated in Figs. 2 and 5, where the formation of pronounced, preferably tapering, shoulders 13 is clearly indicated.

Inserted between the spaced upper ends of the side arms 8 is a wooden grip bar 14 of usual shape and having end portions of reduced diameter, as at 15, each of which is received within the ferrule portion 16 of a metal cap or cup-shaped shell 17. These caps are substantially cylindrical, have a flat closed outer end and are slotted at the bottom to provide apertures 18 within which the ends of the arms 8 are received. The caps thus surround the arm tops and the grip ends, protecting the parts and providing a smooth outer surface at the corners of the handle.

The grip is rigidly fastened in position by a through rivet 19 which is preferably provided at each end with diametrically opposed fins 20. An orifice for the rivet and suitable keyways for the fins 20 may be cut in the folded arm tops in the same operation which stamps out the shoulders 13, and similar apertures may be provided the outer ends of the caps. The wooden grip is thus prevented from rotating in the caps and the latter are rigidly mounted upon the arms 8, for the shoulders 13 afford close contact with the ends of the slot 18. It will be observed by reference to Fig. 5 that, owing to the configuration of the top ends of the arms and the disposition of the apertures 18, there is an appreciable space at 21 between the arm tops and the caps and that the only bearing contacts are at the shoulders 13. This feature of construction insures a proper engagement of these elements at the shoulders irrespective of the exact formation of the extreme end of the arms. A nice regard for the dimension of the curve 12 of the blank is therefore unnecessary and any irregularities of structure of the folded arm top or of the internal diameter of the cap will not interfere with a close and firm engagement at the points 13. Furthermore, a downward thrust upon the grip of the shovel is borne principally upon the shoulders 13 where the fold of the metal provides greatest strength.

A shovel handle constructed as above described may be quickly and conveniently made by suitable machinery with little loss of material; the parts may be easily assembled; and the completed article provides a handle which is extremely rigid and durable in use and agreeable to the grasp of the user's hand. It will be understood, however, that details of structure may be varied for particular purposes and that this invention is not limited to the precise construction described, except in so far as it is defined in the following claims.

I claim:

1. A sheet metal shovel handle comprising a body portion formed of a single metal sheet and including a socket portion adapted to receive the shank of the shovel and spaced side arms, each side arm consisting of a metal strip having its side margins folded flatwise upon its central portion, a grip bar inserted between the ends of the side arms, caps surrounding the ends of the respective side arms and the corresponding ends of the grip bar, each arm having shoulders at its folded edges and each cap having an aperture for receiving the end of the corresponding arm so that the cap engages the arm shoulders at the ends of said aperture.

2. A sheet metal shovel handle comprising a body portion formed of a single metal sheet and including a socket portion adapted to receive the shank of the shovel and spaced side arms having shoulders spaced from their respective upper ends, a wooden grip bar inserted between the ends of the side arms, metal caps each having a ferrule portion fitting over each end of the grip bar and having a bottom aperture adapted to receive the ends of the side arms, each cap engaging the shoulders of the corresponding arm at the ends of the aperture, and means for connecting the caps to the bar.

3. A sheet metal shovel handle comprising a body portion formed of a single metal sheet and including a socket portion adapted to receive the shank of the shovel and spaced side arms having shoulders spaced from their respective upper ends, a wooden grip bar inserted between the ends of the side arms, metal caps each having a ferrule portion fitting over one end of the grip bar, and having a bottom aperture adapted to receive the ends of one of the side arms, each cap engaging the shoulders of the corresponding arm at the ends of the aperture, and a rivet passing through said caps, arms and grip for securing the parts together, the rivet having projecting fins and the caps and arm ends having keyways for said fins for preventing rotation of the grip.

4. A sheet metal shovel handle comprising a body portion including spaced side arms, each arm having a rounded top and a pair of opposed edge shoulders at the bottom of the rounded portion, a grip bar between the said arm tops, a pair of metal caps each having a ferrule portion fitting over the end of the grip bar and having a bottom aperture adapted to receive the tops of the side arms, each arm top fitting within and being covered by one of the caps with its extreme upper end spaced from the inner surface of the said cap and its shoulders engaging the cap at the ends of the said aperture, and means for connecting the caps to the arms and grip bar.

Signed by me at Boston, Massachusetts, this 10th day of June, 1927.

VERE S. YARNALL.